United States Patent [19]

Boudreau et al.

[11] Patent Number: 4,957,342
[45] Date of Patent: Sep. 18, 1990

[54] SINGLE-MODE OPTICAL FIBER ARRAY PACKAGE FOR OPTOELECTRONIC COMPONENTS

[75] Inventors: Robert A. Boudreau, Hampton, N.H.; William C. Rideout, Townsend, Mass.

[73] Assignee: GTE Laboratories Incorporated, Waltham, Mass.

[21] Appl. No.: 444,500

[22] Filed: Nov. 30, 1989

Related U.S. Application Data

[63] Continuation-in-part of Ser. No. 439,761, Nov. 20, 1989.

[51] Int. Cl.$^5$ ............................ G02B 6/32; G02B 6/36
[52] U.S. Cl. ................................. 350/96.18; 350/96.20
[58] Field of Search ............... 350/96.10, 96.15, 96.18, 350/96.20, 96.21, 320

[56] References Cited

U.S. PATENT DOCUMENTS

| | | | |
|---|---|---|---|
| 4,575,194 | 3/1986 | Streifer et al. | 350/413 |
| 4,616,899 | 10/1986 | Schlafer | 350/96.18 |
| 4,732,448 | 3/1988 | Goldenberg | 350/96.18 |
| 4,752,109 | 6/1988 | Gordon et al. | 350/96.18 |
| 4,767,172 | 8/1988 | Nichols et al. | 350/96.18 |
| 4,878,724 | 11/1989 | Thaniyavarn | 350/96.14 |

Primary Examiner—Akm Ullah
Attorney, Agent, or Firm—James J. Cannon, Jr.; Victor F. Lohmann, III

[57] ABSTRACT

A package for an optoelectronic array device having an array of n active elements optically coupled to an array of n single-mode optical fibers which connect said optoelectronic array to an external device includes a housing having a solderable substrate to which the array device is secured, a graded index lens also secured to said array at a distance calculated to provide a known magnification of light beams emanating from said array and n uptapered single-mode optical fibers actively aligned to said magnified light beams to achieve optimal optical coupling to said optoelectronic array. The package optionally includes a multifiber holder having precisely calculated spacing based on the spacing of said active elements which are usually semiconductor lasers and the magnification of said lens. For a two-dimensional surface array, the package includes a mandrel to position the uptapered optical fibers.

49 Claims, 8 Drawing Sheets

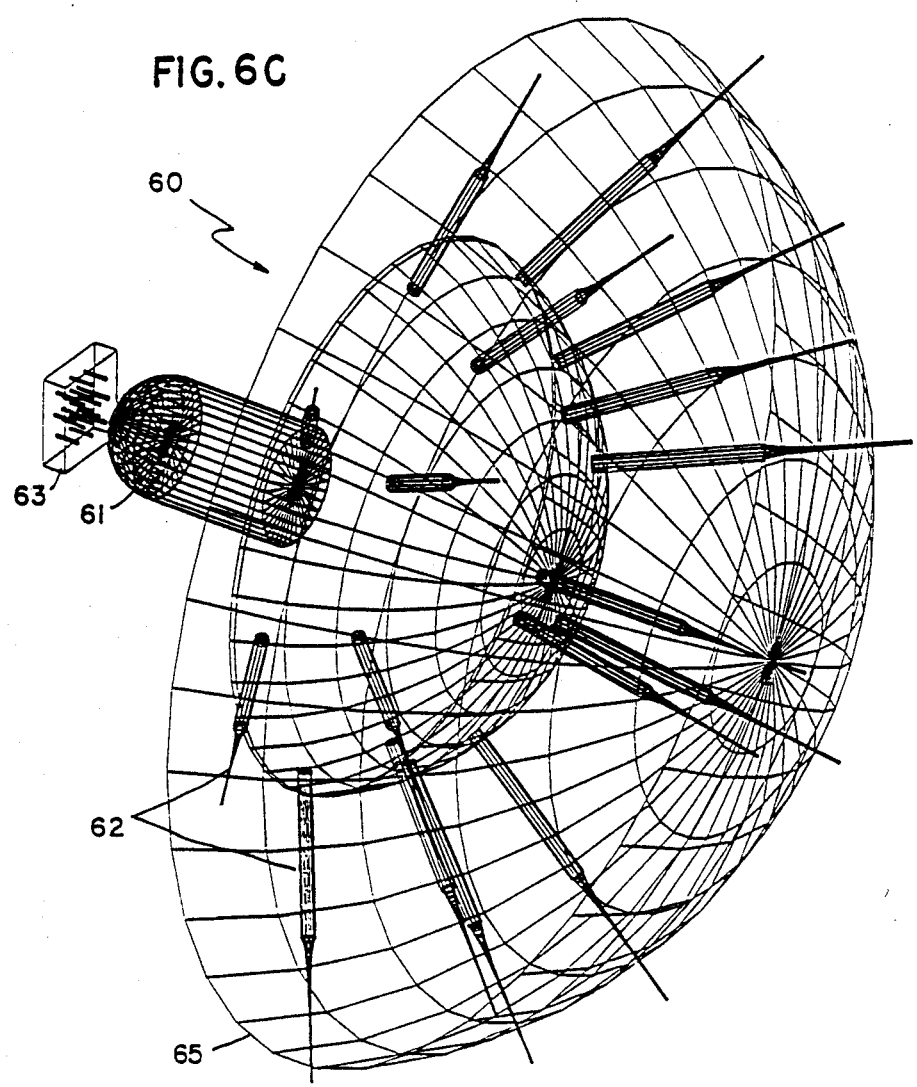

SINGLE-MODE OPTICAL FIBER ARRAY PACKAGE FOR OPTOELECTRONIC COMPONENTS

CROSS REFERENCE TO RELATED APPLICATION

This application is a continuation-in-part of a prior pending application entitled "A Method of Aligning and Packaging an Optoelectronic Component with a Single-Mode Optical Fiber Array," filed by the same inventors on Nov. 20, 1989, Ser. No. 07/439,761, and assigned to the same assignee as this application now allowed.

BACKGROUND OF THE INVENTION

This invention related to packaging of optoelectronic components which generate or process signals that pass through optical fibers. In particular, it addresses the critical need for providing stable, low-cost alignment of multiple single-mode optical fibers to a single packaged device, such as a semiconductor array of laser amplifiers, lasers or photodetectors. Such devices have closely spaced active regions to which the optical fibers must be coupled.

An optoelectronic package is a container or housing that provides protection and support for both active and passive components contained within it. These components and their interconnection represent an optical-electrical circuit and define the function of the package. The package also includes a means of connecting the internal components with the external environment, usually as electrical feed-through and optical fiber. Our invention is concerned with the optical fiber and how it is connected to the components within the package.

To make an optical connection between an optical fiber and an optoelectronic component within a package, it is necessary to position or align the optical fiber in a way that allows efficient coupling between the optical fiber and the optoelectronic component. The precision needed for the alignment depends on the size of the light-emitting or light receiving elements, the type of optical fiber, and any type of focusing or defocusing elements which may be present. Optical fiber transmits light through its inner core, which is much smaller than the diameter of the optical fiber. There are two classes of optical fiber presently used in packaging semiconductor devices: single-mode and multi-mode, with typical core diameters of about 10 microns and 50 microns, respectively. Many telecommunication applications use single-mode optical fiber because of the superior bandwidth arising from its reduction of mode partition noise.

The prior art for multi-fiber array alignment to a single package is predominantly concerned with the easier task of coupling large-core multi-mode optical fiber to relatively large light sources and detectors. These alignments are less sensitive to position and can often be done with grooved parts and epoxy to fasten the optical fiber. This technology is acceptable for short length optical fiber links in local area networks or computers, but not for telecommunications.

Connecting single-mode optical fiber to semiconductor devices is difficult. Extremely tight tolerances, on the order of one micron, are needed due to the small size (about one micron) of the active region and the small optical fiber core. Optical fibers are usually actively aligned to the semiconductor component. This means that for the semiconductor laser, the laser is electrically biased to emit light. The optical fiber is then aligned to a position that maximizes its reception of light, a condition monitored by coupling a photodetector to the opposite end of the optical fiber. The manipulation of the optical fiber is usually done with a suction-tipped micromanipulator arm with piezo-electric controls having submicron positional sensitivity. Additional problems arise when more than one optical fiber needs to be coupled to a single device, since this necessarily entails either simultaneous alignment or sequential alignment to multiple optical fibers. Simultaneous alignment is a situation in which each optical fiber must be physically connected to a manipulator of some kind, the optical fibers then moved together and then held in position all at the same time. Sequential alignment is the process of aligning separate optical fibers, one by one. Alignment of one optical fiber often disrupts previously aligned optical fibers such that the overall yield of the process may be low. For array alignments, the active elements may be only 150 to 300 microns apart on the semiconductor, leaving little room for holding the optical fibers, which normally have outside diameters (core plus cladding) of 125 microns. The optical fibers would be nearly in contact with each other when positioned for direct coupling to the active regions on the semiconductor.

Once single-mode optical fibers are aligned, they are usually fixed in their position by laser welding or soldering. It has been shown that the application of a graded index (GRIN) lens with an uptapered optical fiber will increase the alignment tolerances to the extent that the more easily made epoxy attachment can be made at room temperature and without the cost of laser welding. This advantage is present in our invention as applied to arrays.

SUMMARY OF THE INVENTION

The principle object of the present invention is to provide an optoelectronic component package in which multiple single-mode optical fibers are efficiently optically coupled to an array of closely spaced active semiconductor elements.

A second object of the present invention is to provide such a package for optical connections that permit independent transfer of telecommunications data and information for each semiconductor element.

Another object of this invention is to provide such a package that is not limited to one-dimensional arrays, such as standard edge emitters and detectors, but can also be used for two dimensional arrays, such as surface emitters and detectors.

Still a further object of the present invention is to provide such a package having a predictable, reproducible location of the optical fibers for maximum coupling efficiency, so that an entire array of optical fibers can be simultaneously aligned, taking maximum advantage of the extreme precision of the semiconductor array dimensions, and allowing for assembly line mass production of packaged optoelectronic components.

A further object of the invention is to provide a package which offers the opportunity to introduce optical filtering of the separate beams in an array, due to the increased space between the lens and the fibers.

In a first aspect of the invention, a package for an optoelectronic array device having an array of active elements optically coupled to an array of single-mode optical fibers connecting said optoelectronic array to an external device includes a housing to enclose the necessary components to convert electrical signals to optical signals. A substrate carrier within said housing has a solderable surface. An optoelectronic array device having n active elements is secured to said substrate. A graded index lens, having a numerical aperture sufficient to access optically said n active elements and having a curvature on one end closest to said optoelectronic array, is secured to said substrate a fixed distance from said optoelectronic array of active elements to yield a desired magnification of light beams emanating from said active elements. An array of n uptapered single-mode optical fibers extends from within said housing to the exterior of said housing through a port thereof, said optical fibers being positioned by active alignment and secured to said substrate such that the uptapered end of each of said optical fibers is optically coupled through said lens to one of said n active elements of said optoelectronic array and the opposite end of said optical fiber is outside said housing, and such that the distance between said optical fibers matches the distance between light beams emanating from said active elements.

In a second aspect of the invention, a single-mode optical fiber array package providing precise, stable alignment of an array of optical fibers with a two-dimensional semiconductor surface array having a plurality of active elements within said package, includes a housing to enclose the necessary components to convert electrical signals to optical signals. A substrate carrier having a solderable surface is situated within said housing. An optoelectronic array device having n active elements is secured to said substrate. A graded index lens, having a numerical aperture sufficient to access optically said active elements and having a curvature on one end closest to said array, is secured to said substrate a fixed distance from said array of active elements to yield a desired magnification of light beams emanating from said active elements. An array of n uptapered single-mode optical fibers extends from within said housing to the exterior of said housing through a port thereof for connection of said surface array to a device external to said housing. A mandrel is provided to position and support said n uptapered optical fibers, said optical fibers being positioned by active alignment and secured to said mandrel such that the uptapered end of each of said optical fibers is optically coupled through said lens to one of said n active elements of said surface array and the opposite end of said optical fiber is outside said housing, and such that the distance between said optical fibers matches the distance between light beams emanating from said active elements. Said mandrel is potted to said package in said aligned position of said optical fibers.

In a third aspect of the invention, an improved package providing for the precise, secure alignment of multiple single-mode optical fibers to a single packaged optoelectronic array device having an array of at least two light-emitting sources includes a housing to enclose the necessary components to convert electrical signals to optical signals. A substrate carrier having a solderable surface is within said housing. An optoelectronic array device having n light-emitting sources secured to said substrate. A portion of said substrate is adapted to receive said array of optical fibers. A graded index lens having a numerical aperture sufficiently large to optically access the light-emitting sources of said optoelectronic array is secured to said substrate of said package a fixed distance from said optoelectronic array such that the light beams from said light-emitting sources are magnified and the spacing between said beams is expanded. Said optical fibers are actively aligned with said light-emitting sources by optically coupling the thick end of one uptapered single-mode optical fiber to each light beam emanating from said optoelectronic array after said beam has been magnified by said lens. Said optical fibers are secured to said fiber stage of said package after alignment.

In another aspect of the invention, the improved package provides a multi-fiber holder adapted to receive n uptapered optical fibers in fiber-receiving positions which are determined by the optoelectronic array-to-lens spacing, such that each of said n uptapered optical fibers may be optically coupled to one correspondingly positioned light-emitting source through said lens. Said n optical fibers in said multi-fiber holder are actively aligned with said light-emitting sources by the alignment of its central optical fiber with the corresponding central light-emitting source. Said multi-fiber holder is secured in its aligned position with epoxy.

BRIEF DESCRIPTION OF THE DRAWINGS

FIGS. 6a, 6b and 6c are side, end and perspective views respectively of an embodiment of an optoelectronic package in which uptapered optical fibers are coupled through a lens to a seventeen-element, two-dimensional surface array.

DESCRIPTION OF THE PREFERRED EMBODIMENTS

Figure 1A:
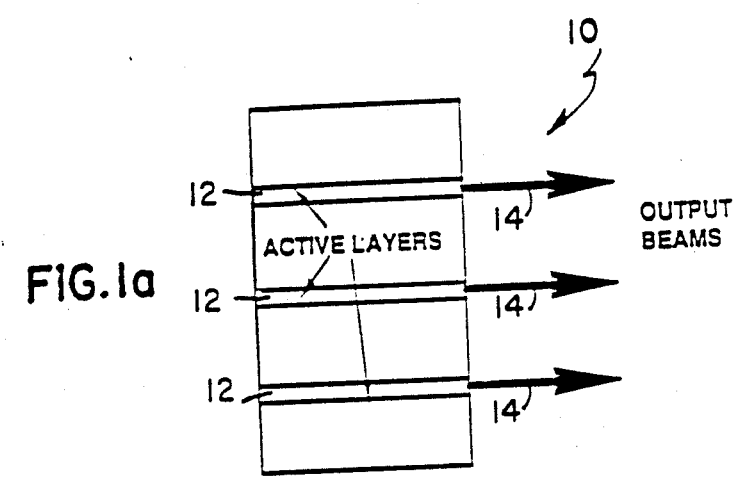
FIG. 1a is a schematic top view of an array of three semiconductor lasers.
Figure 1B:
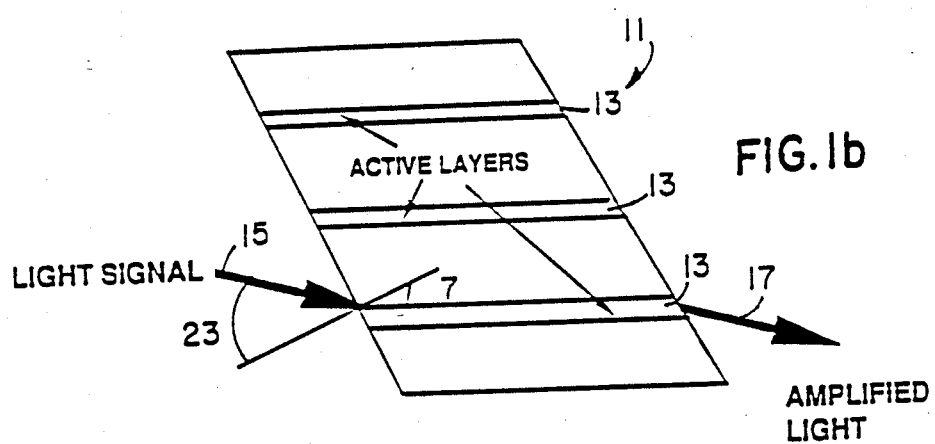
FIG. 1b is a schematic top view of an array of three semiconductor laser amplifiers.
Figure 1C:
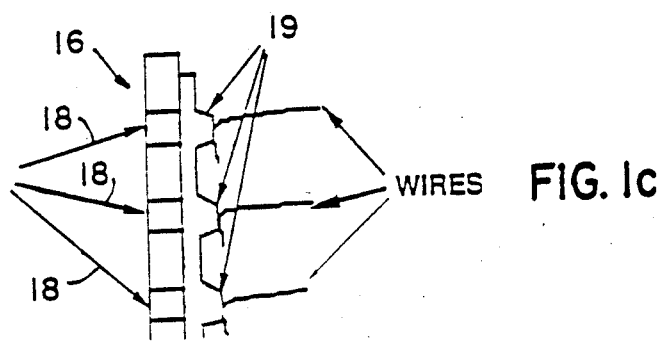
FIG. 1c is a schematic side view of an array of three semiconductor optical detectors.

This invention pertains to packages for optoelectronic array devices which provide stable alignment of multiple single-mode optical fibers to the component using a method for quick and efficient optical coupling of multiple single-mode optical fibers to an array of closely spaced active semiconductor elements. The method has been disclosed and claimed in a prior application entitled "A Method of Aligning and Packaging an Optoelectronic Component with a Single-Mode Optical Fiber Array,", filed Nov. 20, 1989, Ser. No. 07/439,761, assigned to the assignee of this application and having the same inventors now allowed. Examples of semiconductor devices which require multiple optical fibers set in an array are shown in FIGS. 1a, 1b and 1c. FIG. 1a shows an array 10 of semiconductor lasers 12, used as light sources for such purposes as parallel processing. An optical fiber must be coupled to each lasing output beam 14. FIG. 1b shows an array 11 of optical amplifiers 13, which receive light at one end and output the amplified light at the other end. One array of optical fibers 15 must couple the light signals into the optical amplifiers, and another array of optical fibers 17 must couple the amplified output. FIG. 1c shows an array 16 of detectors 19. One array 18 of optical fibers must couple the light signals into these detectors 19.

Figure 2:
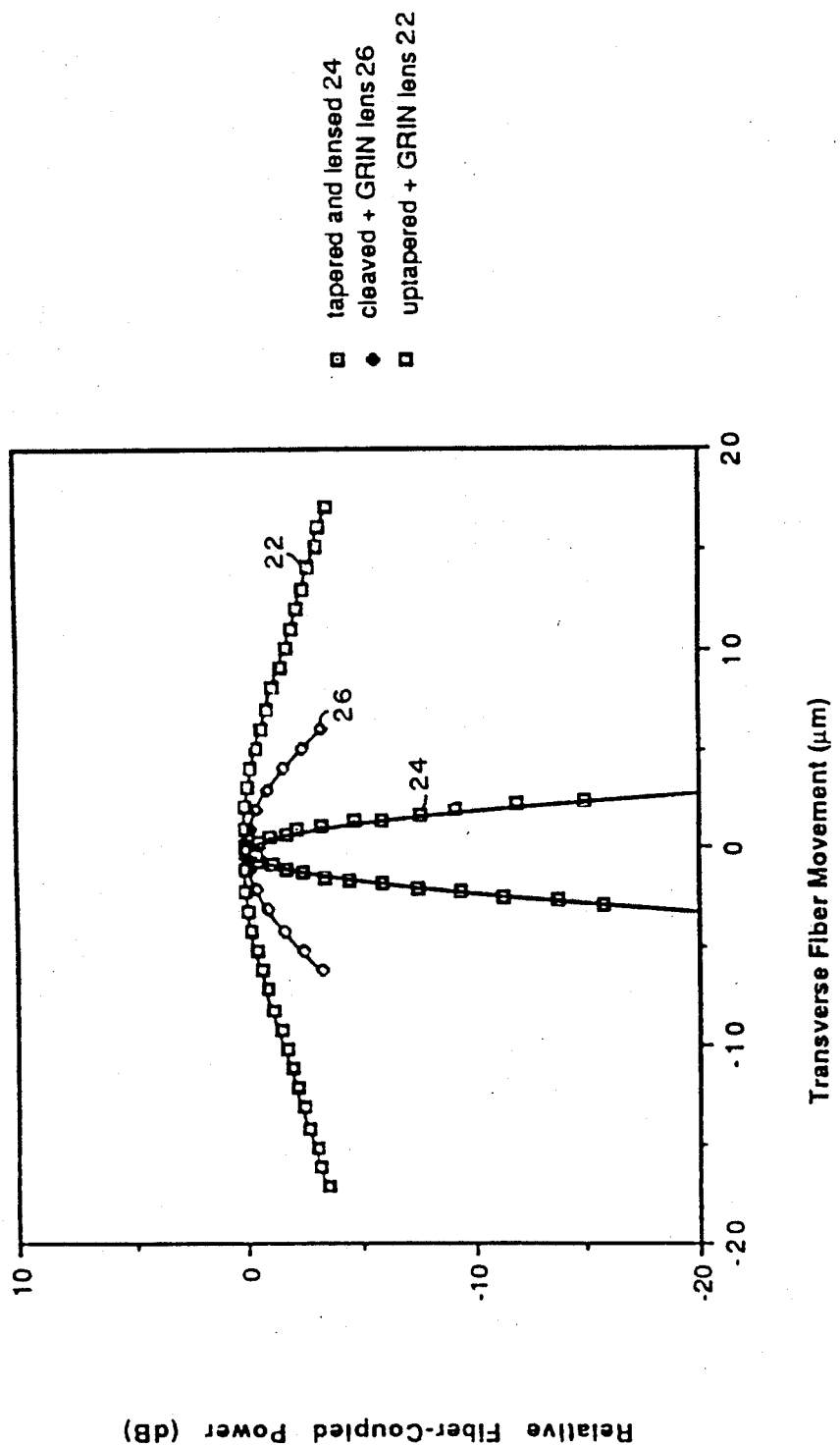
FIG. 2 is a graph showing the transverse sensitivities of the various single-mode optical fiber couplings to a semiconductor laser.

FIG. 2 shows coupling performance, that is, the effect on relative fiber-coupled power and dB of transverse fiber movement, between a single-mode optical fiber and a high speed laser, a typical telecommunications component. For conventional tapered and lensed optical fibers, shown on line 24, the positional sensitivity can be as little as one micron, a size much smaller that the parts themselves. FIG. 2 also shows the use of an uptapered optical fiber and a graded index (GRIN) lens, line 22. This uptapered optical fiber system has the advantage of relaxing the lateral positional tolerances of the optical fiber at the expense of tightening the angular tolerances. FIG. 2 also shows the third case where a GRIN lens is used with a standard cleaved optical fiber, line 26. This is an intermediate case of positional sensitivity, but is considered unfavorable for arrays because the magnification is insufficient. With all methods, problems are compounded when more than one single-mode optical fiber must be aligned to the same package in an array. By reducing the positional sensitivity, it is possible to achieve the necessary yield improvement required for doing array alignments.

The package of this invention uses a lens, with a sufficient numerical aperture and magnification, in conjunction with uptapered single-mode optical fiber. The alignment technique takes advantage of the relaxed mechanical tolerance and increased fiber-to-fiber spacing arising from the magnification provided by the lens and the larger cored uptapered fiber optics. Such optical connections then permit independent transfer of telecommunications data and information for each semiconductor element.

Specifically, this invention provides a new package for optically coupling multiple single-mode optical fibers to a single packaged optoelectronic array device using a single lens with the array of semiconductor elements in order to magnify the images of the various active elements to expand the spacing between them as well as their size. These separate images are then coupled to an array of uptapered optical fibers. This magnification greatly facilitates mechanical alignment and coupling of the semiconductor elements to the associated array of optical fibers by relaxing mechanical tolerances associated with the positions of the rays of light coming from the multiple lasers. It also separates the positions of the rays sufficiently to allow space for mechanical fixturing to hold the separate optical fibers to receive the light.

Uptapered optical fibers are used because the effect of magnification not only increases the spacing between the separate rays of light but also increases the size of the separate beams or spots. These beams are best collected on the thick end of the uptapered fiber, where the size of the optical fiber best matches the size of the separate beams. For example, a typical uptapered optical fiber may have a core that is ten times larger on its thick end than the single-mode optical fiber that it tapers down to. This optical fiber is used with a lens that magnifies everything tenfold, both the spot size of the beam as well as the spacing between beams. This effect facilitates the alignment when assembling an optoelectronic package, since the magnification typically results in a spacing of about three mm between separate light beams.

This description of the preferred embodiments also applies to the case of an array of detectors, in which case the light path is simply in the reverse direction, passing from the optical fiber to the semiconductor.

Simultaneous alignment is also possible with these systems because the location of the semiconductor array beams can be known with high precision relative to the central beam in the array. This is because the semiconductor elements are usually patterned on the semiconductor with photolithography to a high level of precision, about one micron, and the lens projects a precise image of this pattern towards the fibers. If a lens with known magnification is first positioned rigidly in a central specified location, then the locations of the other projected beams are known. Alignment to this central beam automatically aligns other optical fibers held collectively in a fixture engineered with the geometry set by the known magnification determined by the lens. Tolerance errors are also greatly reduced if only a single lens is used, eliminating errors incurred from alignment of multiple lenses to each other.

One limitation of the invention that must be considered is the issue of numerical aperture (N.A.) of the lens. This is analogous to field of view through a microscope or a pair of binoculars. The numerical aperture of the lens is defined as:

$$N.A. = n \cdot \sin a,$$

where
  a = lens acceptance angle, and
  n· = index of refraction of the lens.

This limits the number of semiconductor elements arranged in a line that can be accessed optically. A lens with the largest possible numerical aperture should be chosen. A good value for the numerical aperture is about 0.6, and all our experimentation was conducted with a lens having this numerical aperture. Using this lens, we were able to easily couple to an in-line five-element array.

One special feature of our invention is that the effect of the numerical aperture limitation can be eliminated or reduced when used in conjunction with a surface emitting array since the field of view is two-dimensional. Presently, no schemes exist for coupling single-mode optical fiber to semiconductor surface arrays. However, this method is valuable in making that possible by relaxing positional tolerances. Since the system works well with a five-element in-line array, it follows that it works for a seventeen-element surface array having elements arranged within a numerical aperture limited circle on the semiconductor. The projected and magnified image of the surface array replicates the high precision of the placement of the array elements, facilitating the fabrication of a support structure or mandrel which supports the uptapered optical fibers. Simultaneous alignment to all optical fibers is performed by first aligning the center fiber, and then rotating the mandrel to align the rotational orientation.

FIRST EMBODIMENT

Figure 3:
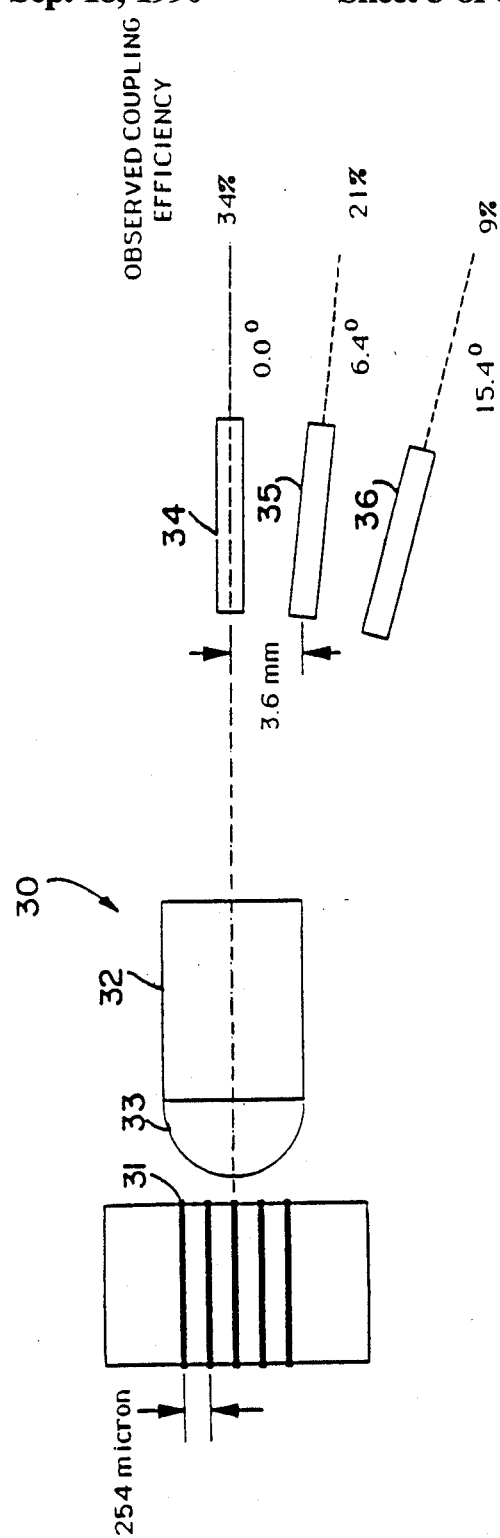
FIG. 3 is a diagrammatic view of a first embodiment of the method of the invention illustrating the use of a GRIN lens to couple an array of uptapered optical fibers to a semiconductor laser array.

The first embodiment of this invention is the method of using a GRIN lens to couple an array of uptapered optical fibers to a semiconductor laser array. This is shown in FIG. 3. The semiconductor laser array 30 is a single solid-state microelectronic chip with five separate laser elements 31 on it. The GRIN lens 32 used is a SELFOC pch 1.8–0.22 Micro Lens (SML). It has a physical diameter of 1.8 mm and an overall length of 3.3 mm. A curvature 33 is present on the end of the lens closest to the laser array 30 in order to reduce distortions and increase the numerical aperture to 0.6. The lens 32 is centered on the laser array 30 and is located at a distance of about 0.37 mm from the laser array 30. A first uptapered optical fiber 34 in located about 15 mm away from the back of the lens 32. The spacing between lasers 31 in the array 30 is about 250 microns, while separation between uptapered optical fibers 34, 35, 36, as a result of the magnification, is about 3 mm. The separate light beams emerging from the lens 32 arrive at the uptapered optical fibers 34, 35, 36 at different angles, depending on the magnification and the displacement of the separate light sources from the centerline of the lens 32. For the five-element case shown, the outside beams arrive at about 15 degrees, as compared to 0 degrees for the central beam. When optically aligning this system, it is important to first rigidly fix the location of the GRIN lens 32 with respect to the laser array 30. This is done with a moderate melting point solder rather than a low melting point solder to reduce the creep of the parts. The magnification is highly dependent on the array-to-lens distance. For example, this lens produces magnifications of about 34, 9.7 and 4 for laser-to-lens distances of about 0.3, 0.4 and 0.6 mm respectively. The magnification is selected depending on the predetermined spacing desired between the separate uptapered optical fibers 34, 35, 36, or what would best match the spot size of the magnified beam and the uptapered optical fiber cores. In this embodiment, a magnification of about ten was used.

Alignment of the uptapered optical fibers 34, 35, 36 to the beam is done to a precision of about 0.5 degrees of arc. Since the uptapered optical fibers have a fairly long, narrow and rigid geometry, this tolerance is easy to achieve. Also, as shown in FIG. 2, the uptapered optical fiber has a more relaxed transverse positional tolerance compared to conventional optical fiber. In our test of this embodiment, the optical fibers 34, 35, 36 were actively aligned using a micromanipulator while the laser array was operating. The manipulator was capable of controlling the optical fiber position to a transverse tolerance of about five microns.

SECOND EMBODIMENT

Figure 4:
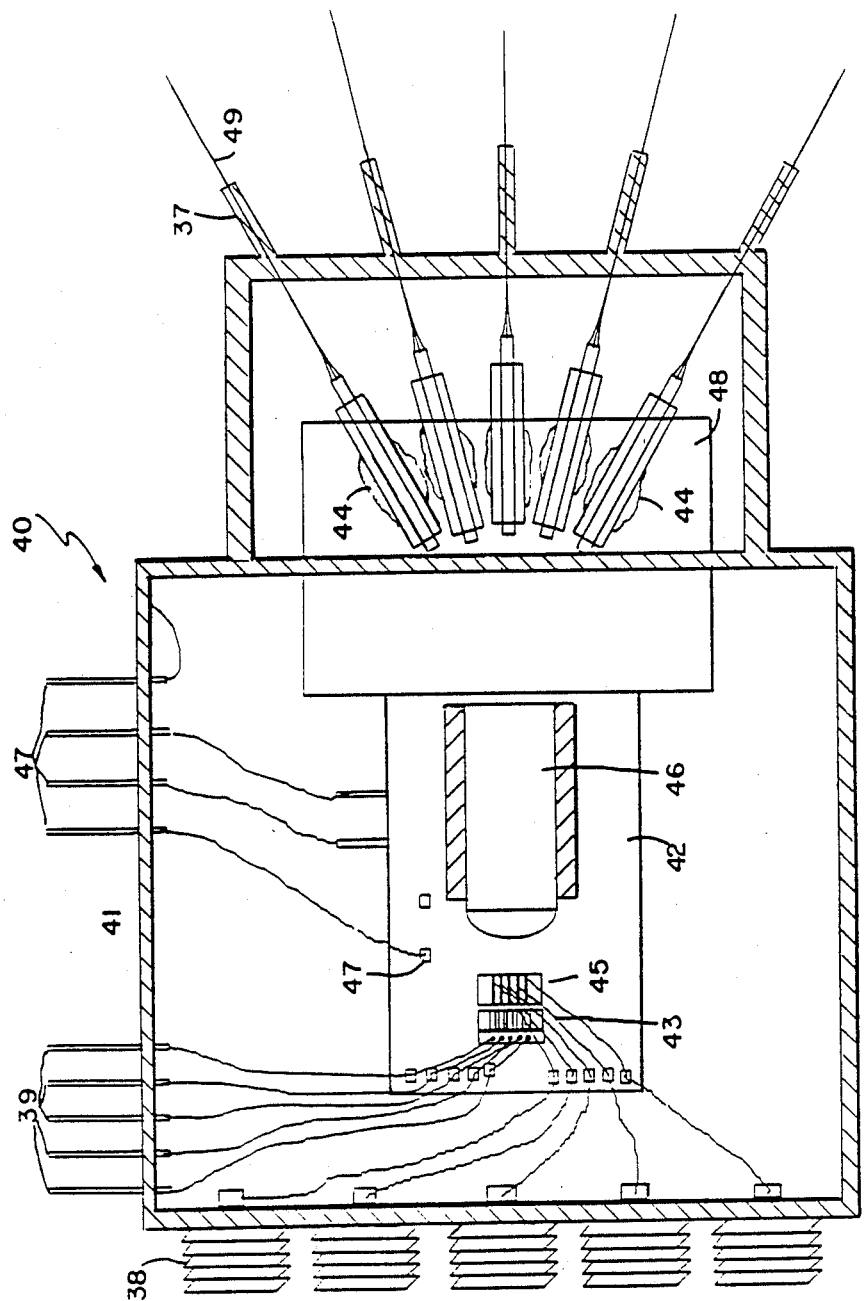
FIG. 4 is a top cut-away view of a first embodiment of an optoelectronic package embodying the method illustrated in FIG. 4.

The second embodiment of this invention is a package apparatus employing the method described in the first embodiment. This package 40, for use with a five-element laser array, is shown in FIG. 4. A metal housing 41, indicated by the dotted gray border in the diagram, encloses the necessary components that convert input electrical signals 38 to optical signals. A carrier 42 having a surface that is readily solderable, such as gold-plated copper or brass, is used to support the components. The photodetector monitor array 43 and its associated shadow mask to prevent crosstalk between monitored array outputs 39 is optional. Its function is to keep the laser output power constant, but it may not be necessary, depending on the lasers or the application.

As is common practice, the semiconductor array 45 is first diebonded to an efficient, thermally conductive heatsink, such as diamond or boron nitride. The unit is then located on the carrier 42 by soldering to either a pedestal or a reference mark. For package 40, this can be done to an accuracy of about 15 microns. The GRIN lens 46 is then located on the same carrier 42 with respect to the laser 45 using a mechanical stop of carrier 42, and soldered in place with a moderate melting point solder such as 62/36/2 SnPbAg eutectic which melts at 179 degrees C.

The carrier assembly is completed by adding the usual thermistor 47 and internal wirebonds. Finally, the carrier 42 is soldered to the top of a thermoelectric cooler (TEC) (not shown) which is located within the package housing 41. When the package is in operation, the TEC in conjunction with the thermistor is used to stabilize the operating temperature of the semiconductor 45 to maintain constant output power, a common practice. Wirebonding is performed to connect components on the carrier 42 to the output and input electrical pins.

As shown in FIG. 4, part of carrier 42 includes a section called the fiber stage 48. This is the part to which the uptapered optical fibers 49 attach. Fiber stage 48 is best as an integral part of carrier 42 to reduce small movements of the optical fiber 49 relative to lens 46.

The optical fiber alignment is done actively, as described earlier for single element semiconductors, except that the alignments are done sequentially and fastened into position with a room temperature curing epoxy to prevent disturbance of previously aligned optical fibers. The uptapered fiber optics relaxes the tight transverse tolerances sufficiently to allow for an epoxy fastening, as discussed earlier. Each alignment is done separately using the vacuum-tipped micromanipulator.

The package is completed by sealing a lid on it with epoxy and providing additional support for the optical fibers exiting the package through the fiber ports. The package is then tested and ready for delivery.

THIRD EMBODIMENT

Figure 5:
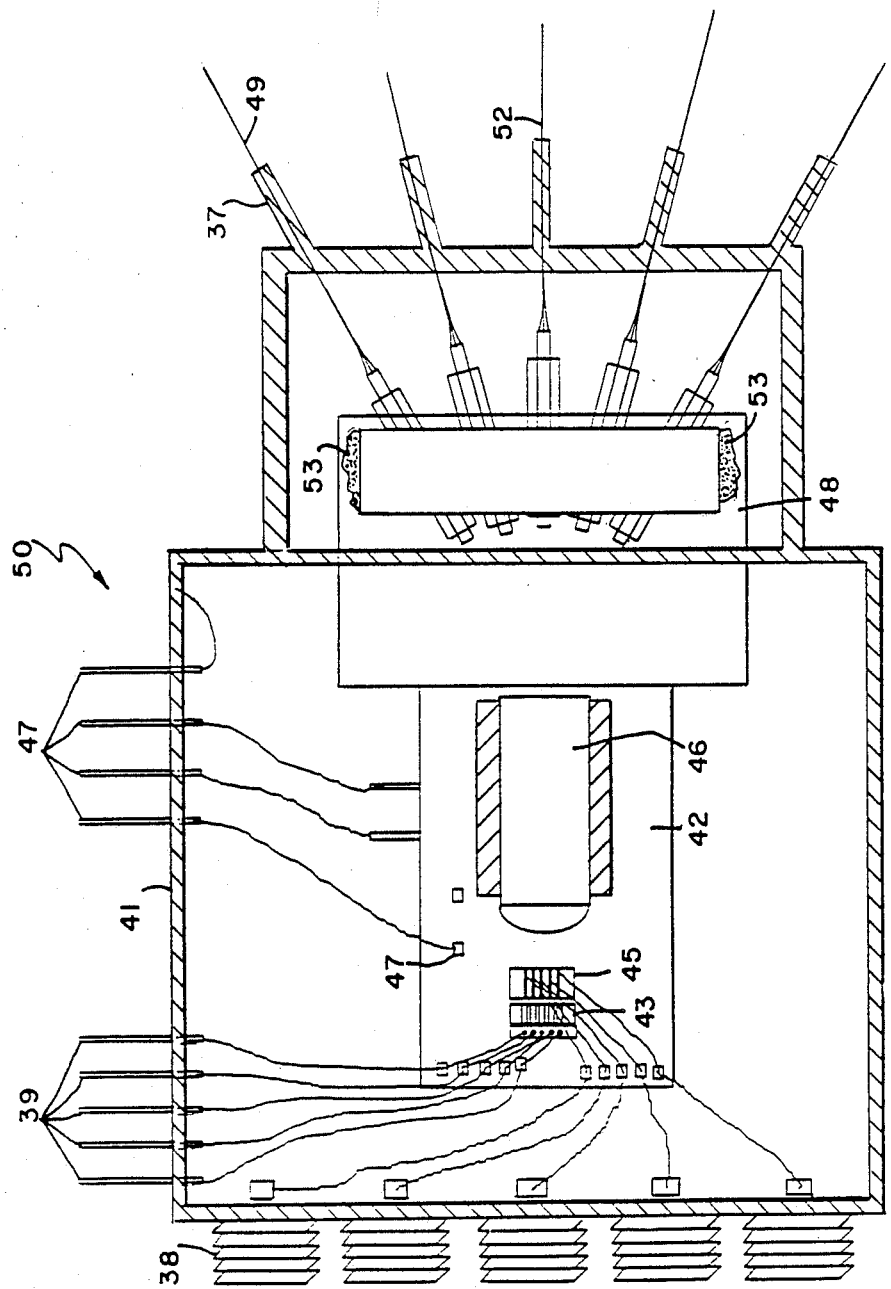
FIG. 5 is a top cut-away view of a second embodiment of an optoelectronic package, similar to that of FIG. 4, but further including a multi-fiber holder.

The third embodiment is the package apparatus 50 and a method for doing a simultaneous alignment of the array of optical fibers. This is shown in FIG. 5. Package 50 and its assembly is basically the same as that described in the second embodiment, except that all the optical fibers are previously mounted in a multi-fiber holder 51. The geometry of the holder 51 is predetermined based on the laser array-to-lens spacing. Multi-fiber holder 51 is then aligned to the center optical fiber 52 only. Most of the error associated with the alignment of the other optical fibers is taken up in this first alignment. The central optical fiber alignment automatically positions the alignment of the other optical fibers because of the photolithographic precision of the active laser elements on the chip, as discussed before. Holder 51 is then epoxied in position as if it were a single optical fiber, and the package is completed as described earlier. This system sacrifices some precision in exactly locating each optical fiber in exchange for a process that requires less time to complete all alignments.

FOURTH EMBODIMENT

Figure 6A:
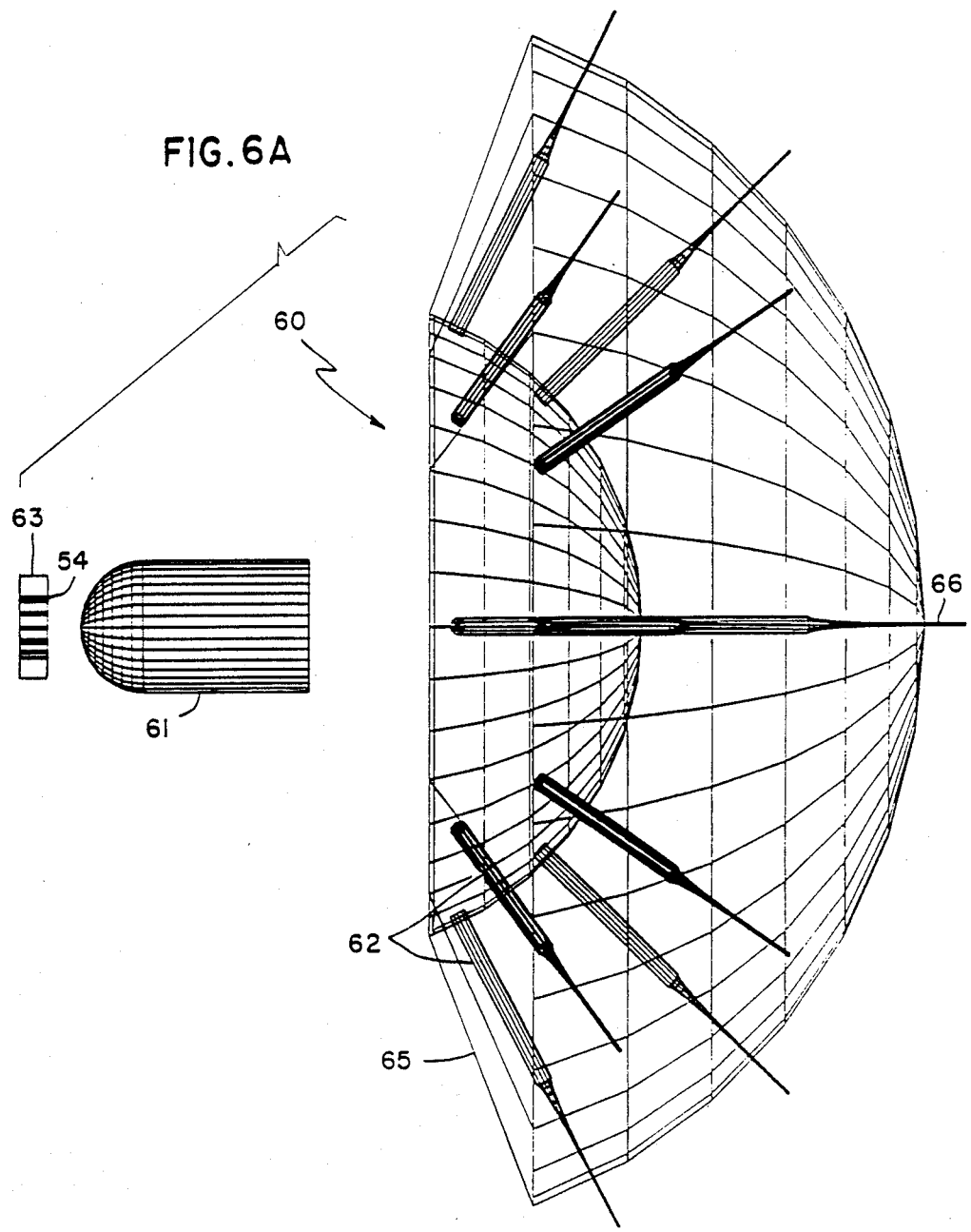
Figure 6B:
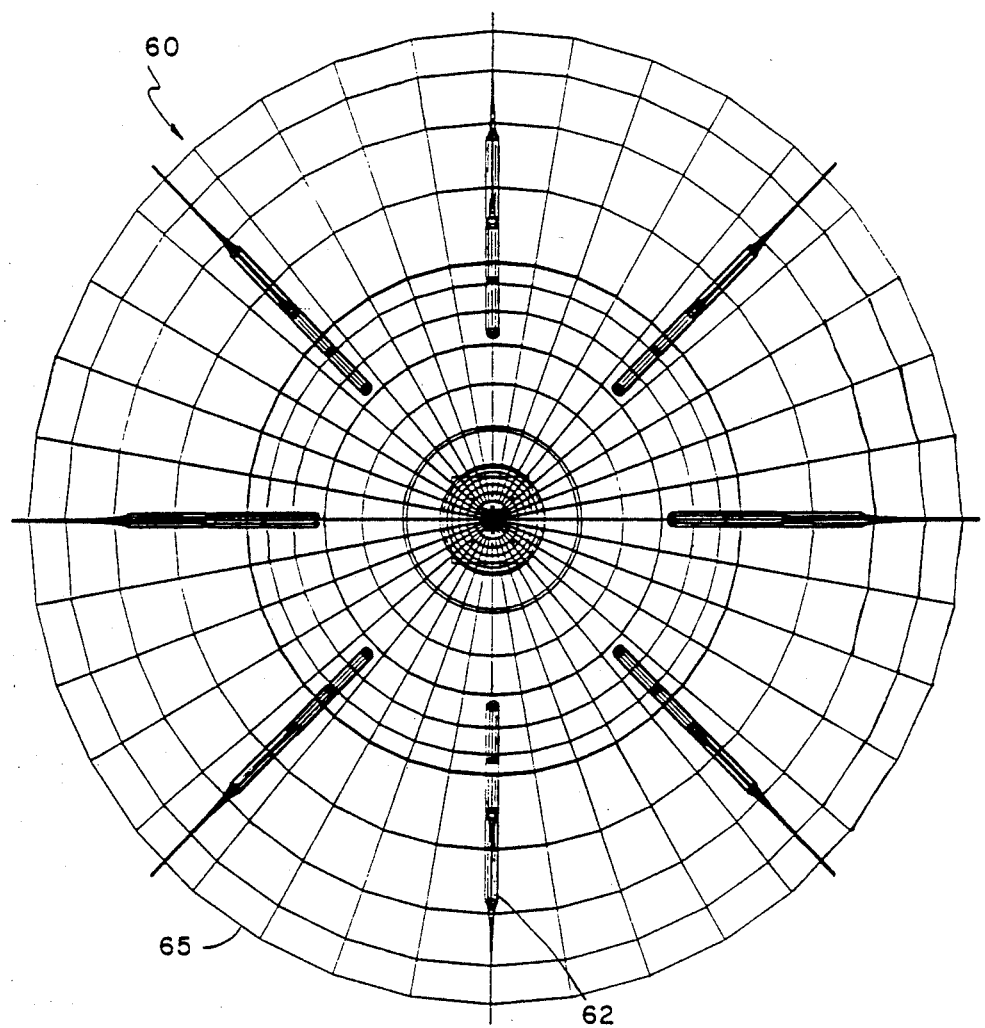

The fourth embodiment is package 60, resulting from the method of using the graded index lens 61 with uptapered optical fibers 62 to couple to elements 64 of two-dimensional surface array 63, as shown in FIGS. 6a, 6b and 6c. Since the numerical aperture of lens 61 accepts light from a two-dimensional surface in the same way as it does from a line of active elements, it follows that the method will work to the same degree of precision and tolerance for other cases. As shown in the figures, light emitted from as many as seventeen elements 64 can be transmitted through lens 61 to optical fibers 62. In practice, it is recommended that optical fibers 62 be held in a support mandrel 65, as shown schematically in FIGS. 6a, 6b and 6c. This allows for the use of the basic simultaneous alignment scheme as described above by first doing an active alignment to the center optical fiber 66, and then rotating the mandrel 65 until a second optical fiber is aligned simultaneously, whence all of the outside fibers come into alignment. The entire mandrel 65 can then be potted into position with epoxy.

VARIATIONS

The major variation possible for our invention is the use of lenses other than a graded index lens. It is reasonable that a convex, planar-convex, or other partially convex lens may be substituted to achieve a similar magnification effect. It is also possible to use cleaved optical fibers rather than uptapered optical fibers and still get a functional package, but we prefer the uptapered optical fibers since they are used with more magnification. The system will work for local area networks (LAN) as well as computers, video and telecommunications. Finally, it should be remembered that our invention applies to any semiconductor array of active elements that needs coupling to a set of optical fibers, and is not limited to laser arrays described in the embodiments.

This invention offers substantial advantages. First, it is not limited to one-dimensional arrays, such as standard edge emitters and detectors, but can also be used for two-dimensional arrays, such as surface emitters and detectors. Secondly, the technique provides a predictable, reproducible location of the optical fibers for maximum coupling efficiency, so that the entire array can be simultaneously aligned. This takes maximum advantage of the semiconductor array dimensions. Thirdly, this method offers the opportunity to introduce optical filtering of the separate beams in an array, due to the increased space between the lens and the optical fibers. Finally, packages for optoelectronic components incorporating this method are feasible.

We claim:

1. A package for an optoelectronic array device having an array of optoelectronic active elements enclosed in a housing and secured to a substrate carrier having a solderable surface within said housing, said active elements optically coupled to an array of uptapered single-mode optical fibers connecting said optoelectronic array device to an external device, comprising:
a graded index lens, having a numerical aperture sufficient to access optically said active elements and having a curvature on one end closest to said optoelectronic array, secured to said substrate a fixed distance from said optoelectronic array of active elements to yield an appropriate magnification of the light beams emanating from said active elements; and
said array of uptapered single-mode optical fibers extending from within said housing to the exterior of said housing through a port thereof, said optical fibers being positioned by active alignment and secured to said substrate such that the uptapered end of each of said optical fibers is optically coupled through said lens to a respective one of said active elements of said optoelectronic array and the opposite end of said optical fiber is outside said housing, and such that each optical fiber is spatially aligned at its uptapered end to a respective one of the magnified light beams.

2. The package of claim 1 wherein said graded index lens is secured to said substrate with a moderate melting point solder.

3. The package of claim 1 further comprising:
a photodetector monitor array and shadow mask mounted on said substrate to prevent crosstalk between monitored outputs of said optoelectronic array and to maintain constant output power.

4. The package of claim 1 further comprising:
a heatsink secured to said substrate carrier; and
said optoelectronic array device is die-bonded to said heatsink.

5. The package of claim 1, further comprising:
a thermoelectric cooler positioned under said substrate carrier within said housing to maintain a stabilized temperature for said optoelectronic array device.

6. The package of claim 1 wherein said optical fibers are secured to said substrate by a room temperature curing epoxy.

7. The package of claim 1 further comprising a support for said optical fibers, said support being positioned at the ports of said housing through which said optical fibers extend.

8. The package of claim 1 further comprising:
a multi-fiber holder adapted to receive said uptapered optical fibers in fiber-receiving positions which are determined by the active element array-to-lens spacing, such that each of said uptapered optical fibers may be optically coupled to one correspondingly positioned active element through said lens;
said optical fibers in said multi-fiber holder being actively aligned with said active elements by the alignment of its central optical fiber with the corresponding central active element; and
said multi-fiber holder being secured in its aligned position with epoxy.

9. The package of claim 1 further comprising a cover for said housing.

10. The package of claim 1, wherein a ratio between the core sizes at the uptapered and downtapered ends of each optical fiber ranges from unit to ten.

11. A single-mode optical fiber array package providing precise, stable alignment of an array of uptapered single-mode optical fibers with a two-dimensional semiconductor surface array having a plurality of active elements within said package, said active elements being enclosed in a housing and secured to a substrate carrier having a solderable surface within said housing, comprising:
a graded index lens, having a numerical aperture sufficient to access optically said active elements and having a curvature on one end closest to said array, secured to said substrate a fixed distance from said array of active elements to yield an appropriate magnification of the light beams emanating from said active elements;
said array of uptapered single-mode optical fibers extending from within said housing to the exterior of said housing through a port thereof for connection of said surface array to a device external to said housing;

a mandrel to position and support said uptapered optical fibers, said optical fibers being positioned by active alignment and secured to said mandrel such that the uptapered end of each of said optical fibers is optically coupled through said lens to a respective one of said active elements of said surface array and the opposite end of said optical fiber is outside said housing, and such that each optical fiber is spatially aligned at its uptapered end to a respective one of the magnified light beams;

said mandrel being potted to said package in said aligned position of said optical fibers.

12. The package of claim 11 wherein said graded index lens is secured to said substrate with a moderate melting point solder.

13. The package of claim 11 further comprising:
a photodetector monitor array and shadow mask mounted on said substrate to prevent crosstalk between monitored outputs of said optoelectronic array and to maintain constant output power.

14. The package of claim 11 further comprising:
a heatsink secured to said substrate carrier; and
said surface array device is die-bonded to said heatsink.

15. The package of claim 11, further comprising:
a thermoelectric cooler positioned under said substrate carrier within said housing to maintain a stabilized temperature for said surface array device.

16. The package of claim 11 further comprising:
a support for said optical fibers, said support being positioned at the ports of said housing through which said optical fibers extend.

17. The package of claim 11 wherein said mandrel comprises:
a multi-dimensional multi-fiber holder adapted to receive said uptapered optical fibers in fiber-receiving positions which are determined by the active element array-to-lens spacing, such that each of said uptapered optical fibers may be optically coupled to one correspondingly positioned active element on said two-dimensional surface array through said lens;
said optical fibers in said multi-fiber holder being actively aligned with said active elements by the alignment of its central optical fiber with the corresponding central active element and subsequent rotation of said multi-fiber holder until one other optical fiber is aligned simultaneously, resulting in alignment of said array of optical fibers; and
said mandrel is secured in its aligned position with epoxy.

18. The package of claim 11 further comprising a cover for said housing.

19. A single-mode optical fiber array package providing precise, stable alignment of an array of single-mode optical fibers with a packaged optoelectronic semiconductor array having a plurality of active elements mounted on a substrate within said package, comprising:
a fixture adapted to receive said uptapered optical fibers and hold them in position;
a graded index lens having a numerical aperture sufficiently large to optically access the active elements of said array;
said graded index lens having a predetermined magnification factor being positioned centrally as a function of the precise location of said active elements and rigidly secured to said substrate a fixed distance from said optoelectronic array such that a central beam between said array of said active elements and said optical fibers passes through the center of said lens;
said optical fibers being aligned with said active elements by optically coupling a central one of said uptapered single-mode optical fibers to the central light beam emanating from said optoelectronic array after said beam has been magnified by said lens; and
said uptapered optical fibers being secured to said fixture such that after alignment each of said optical fibers is positioned to be coupled with a beam of known location and size emanating from said array of active elements.

20. The package of claim 19, wherein a ratio between the core sizes at the uptapered and downtapered ends of each optical fiber ranges from unit to ten.

21. The package of claim 19 wherein said graded index lens has a magnification factor of ten.

22. The package of claim 19 wherein said graded index lens magnifies a light beam by a factor of ten and expands the separation of light beams emanating from said active elements by a factor of ten.

23. The package of claim 19 wherein said graded index lens has a numerical aperture of 0.6.

24. The method of claim 18 wherein the number of active elements on said optoelectronic array is less that or equal to five.

25. The package of claim 19 wherein said array is a two-dimensional surface array.

26. The package of claim 25 wherein the number of active elements on said surface array is less than or equal to seventeen.

27. The package of claim 25 wherein said fixture is a mandrel.

28. The package of claim 25 wherein said active elements are arranged in a circle having the numerical aperture of said graded index lens.

29. The package of claim 19 wherein the side of said lens facing said active elements has a curved face.

30. An improved package providing for the precise, secure alignment of multiple uptapered single-mode optical fibers to a single packaged optoelectronic array device having an array of at least two light-emitting sources, said package including
a housing to enclose said light-emitting sources which convert electrical signals to optical signals,
a substrate carrier having a solderable surface within said housing, said light-emitting sources being secured to said substrate,
wherein the improvement comprises:
a portion of said substrate being adapted to receive said array of optical fibers;
a graded index lens having a numerical aperture sufficiently large to optically access the light-emitting sources of said optoelectronic array;
said graded index lens being secured to said substrate of said package a fixed distance from said optoelectronic array such that the light beams from said light-emitting sources are magnified and the spacing between said beams is expanded;
said optical fibers being actively aligned with said light-emitting sources by optically coupling the thick end of one uptapered single-mode optical fiber to each light beam emanating from said optoelectronic array after said beam has been magnified by said lens; and said optical fibers being secured to said fiber stage of said package after alignment.

31. The improved package of claim 30, wherein a ratio between the core sizes at the uptapered and downtapered ends of each optical fiber ranges from unity to ten.

32. The improved package of claim 30 wherein said graded index lens has a magnification factor of ten.

33. The improved package of claim 30 wherein said graded index lens magnifies a light beam by a factor of ten and expands the separation of light beams emanating from said light-emitting sources by a factor of ten.

34. The improved package of claim 30 wherein said alignment further comprises:

a fixture adapted to receive said array of uptapered optical fibers;

said graded index lens having a predetermined magnification factor being positioned centrally and rigidly secured such that a central beam between said optoelectronic array and said optical fibers passes through the center of said lens;

the position of said lens being determined by the precise location of said light-emitting sources on said optoelectronic array and the precise location of said magnified light beams from said activated light-emitting sources as magnified by said graded index lens; and said uptapered optical fibers being secured to said fixture such that each of said optical fibers is positioned to be coupled with a beam of known location and size emanating from said activated light-emitting sources.

35. The improved package of claim 30 wherein said graded index lens has a numerical aperture of 0.6.

36. The improved package of claim 30 wherein the number of light-emitting sources on said optoelectronic array is less than or equal to five.

37. The improved package of claim 30 wherein said optoelectronic array is a two-dimensional surface emitting array.

38. The improved package of claim 37 wherein the number of light-emitting sources on said array is less than or equal to seventeen.

39. The improved package of claim 37 wherein said fixture is a mandrel.

40. The improved package of claim 37 wherein said light-emitting sources are arranged in a circle having the numerical aperture of said graded index lens.

41. The improved package of claim 30 wherein the side of said lens facing said light-emitting sources has a curved face.

42. The improved package of claim 30 wherein said graded index lens is secured to said substrate with a moderate melting point solder.

43. The improved package of claim 30 further comprising:

a photodetector monitor array and shadow mask mounted on said substrate to prevent crosstalk between monitored outputs of said optoelectronic array and to maintain constant output power.

44. The improved package of claim 30 further comprising:

a heatsink secured to said substrate carrier; and said optoelectronic array device is die-bonded to said heatsink.

45. The improved package of claim 30, further comprising:

a thermoelectric cooler positioned under said substrate carrier within said housing to maintain a stabilized temperature for said optoelectronic array device.

46. The improved package of claim 30 wherein said optical fibers are secured to said substrate by a room temperature curing epoxy.

47. The improved package of claim 30 further comprising a support for said optical fibers, said support being positioned at the ports of said housing through which said optical fibers extend.

48. The improved package of claim 30 further comprising:

a multi-fiber holder adapted to receive said uptapered optical fibers in fiber-receiving positions which are determined by the optoelectronic array-to-lens spacing, such that each of said uptapered optical fibers may be optically coupled to one correspondingly positioned light-emitting source through said lens;

said optical fibers in said multi-fiber holder being actively aligned with said light-emitting sources by the alignment of its central optical fiber with the corresponding central light-emitting source; and said multi-fiber holder being secured in its aligned position with epoxy.

49. The improved package of claim 30 further comprising a cover for said housing.

* * * * *